(12) United States Patent
Yahata et al.

(10) Patent No.: US 7,291,844 B2
(45) Date of Patent: Nov. 6, 2007

(54) X-RAY RADIATION DETECTOR, X-RAY IMAGING APPARATUS, X-RAY CT APPARATUS AND METHOD OF MANUFACTURING X-RAY DETECTOR

(75) Inventors: Mitsuru Yahata, Tokyo (JP); Haruo Kurochi, Tokyo (JP); Masaya Kumazaki, Tokyo (JP); Kentaro Ogata, Tokyo (JP); Takuji Sawaya, Tokyo (JP)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 0 days.

(21) Appl. No.: 11/280,373

(22) Filed: Nov. 16, 2005

(65) Prior Publication Data

US 2007/0235654 A1 Oct. 11, 2007

(30) Foreign Application Priority Data

Nov. 22, 2004 (JP) ............................. 2004-337707

(51) Int. Cl.
*G01T 1/20* (2006.01)
(52) U.S. Cl. ................................. 250/370.11
(58) Field of Classification Search ........... 250/370.04, 250/370.09, 370.11
See application file for complete search history.

(56) References Cited

U.S. PATENT DOCUMENTS

| | | | |
|---|---|---|---|
| 4,454,424 A | 6/1984 | Strauss et al. | |
| 4,636,644 A | 1/1987 | Stokes | |
| 4,639,600 A | 1/1987 | Laurer | |
| 6,327,329 B1 | 12/2001 | Bromberg et al. | |
| 6,707,046 B2 | 3/2004 | Possin et al. | |
| 6,749,761 B1* | 6/2004 | Andreaco et al. | ............. 216/24 |
| 6,907,101 B2 | 6/2005 | Hoffman | |
| 6,947,517 B2* | 9/2005 | Hoffman | ...................... 378/19 |
| 2002/0056811 A1* | 5/2002 | Otto | ..................... 250/370.11 |
| 2002/0064252 A1* | 5/2002 | Igarashi et al. | ............... 378/19 |
| 2003/0178570 A1* | 9/2003 | Tsunota et al. | ........ 250/370.11 |
| 2003/0226972 A1* | 12/2003 | Wong et al. | ................ 250/368 |
| 2003/0234363 A1* | 12/2003 | Sekine et al. | .......... 250/370.11 |
| 2004/0256568 A1* | 12/2004 | Sekine et al. | .......... 250/370.11 |
| 2005/0167605 A1* | 8/2005 | Juni | ..................... 250/370.11 |

FOREIGN PATENT DOCUMENTS

JP 2004-093489 3/2004

* cited by examiner

*Primary Examiner*—David Porta
*Assistant Examiner*—Marcus H Taningco
(74) *Attorney, Agent, or Firm*—Armstrong Teasdale LLP

(57) ABSTRACT

The present invention provides a detector which suppress the crosstalk between detector cells while improving the acquisition efficiency of X-ray radiation. The detector includes a plurality of detector cells, arranged along a detection plane of X-ray, in which each detector cell has a scintillator unit made of a scintillator, and a photodiode for transduce the light incoming from the scintillator unit into electric signals. The scintillator units are partitioned each from another by the border, which has a groove extending in the channel and row directions. A scintillator is provided in some part of the border in the incident X-ray direction.

22 Claims, 4 Drawing Sheets

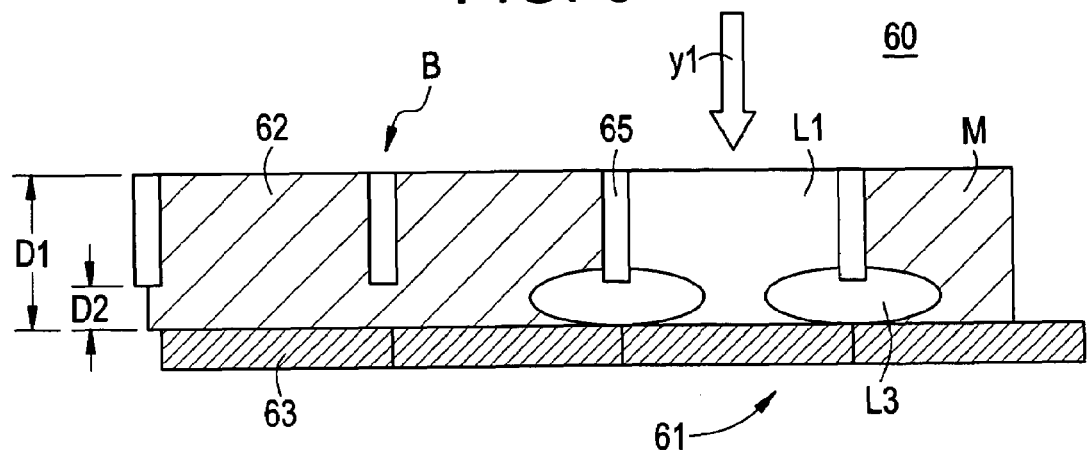
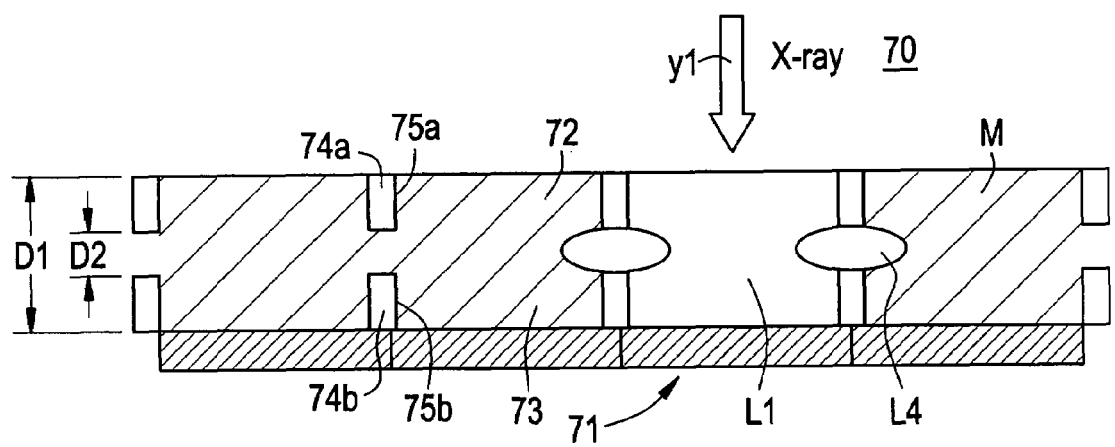
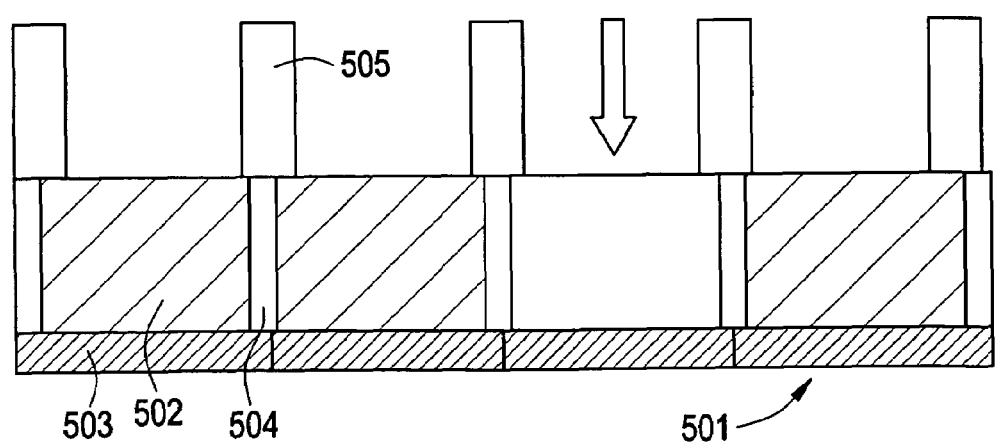

X-RAY RADIATION DETECTOR, X-RAY IMAGING APPARATUS, X-RAY CT APPARATUS AND METHOD OF MANUFACTURING X-RAY DETECTOR

CROSS REFERENCE TO RELATED APPLICATIONS

This application claims the benefit of Japanese Application No. 2004-337707 filed Nov. 22, 2004.

BACKGROUND OF THE INVENTION

The present invention is related to an X-ray radiation detector, X-ray imaging apparatus, X-ray CT apparatus and a method of manufacturing the X-ray detector, and more specifically to the X-ray radiation detector having a plurality of detector cells arrayed in combination of scintillator with a photoelectric transducer element such as a photodiode, various devices and apparatuses incorporating the detector, and the method of manufacturing the detector.

As a detector as have been described above, for example, there are known detectors, which are used for X-ray CT apparatuses. These detectors may have a plurality of detector cells arranged in the direction of channels. There are also known detectors, called multiple arrayed detectors, which may additionally have detector cells arranged in the direction perpendicular to the channel direction (row direction).

FIG. 8 shows a schematic cross sectional view of the detector of the prior art in either the channel direction or row direction. The detector 500 contains a plurality of detector cells 501, each detector cell 501 may have a scintillator 502 and a photodiode 503. Each scintillator 502 is isolated from neighbors scintillators with a reflector 504, which reflects lights, in order to prevent the light that has been transformed from X-ray beam from being received by the photodiode 503 in an adjacent detector cell 501, in other words to avoid the crosstalk. In addition, provided on each of the reflectors 504 is a collimator 505, which limits the X-ray radiation incident into the scintillator 502 to improve the detection precision. It should be noted here that the collimator 505 is provided in order to compensate for the precision error caused by the manufacturing process of the scintillator 502, for example, for the purpose of equalize the surface area of incident plane of each detector cell or the distance between two adjoining incident planes, and is formed thicker than the reflector 504 in the array direction (horizontal direction in the drawing) of each detector cell 501.

As can be seen from the foregoing, in the prior art detector, a predetermined rate of surface area of the X-ray incident plane is occupied by the reflector 504 and the collimator 505, part of incident X-ray attained to the incident plane may not be converted to light, thus not be detected by the scintillator 502. This means that the acquisition efficiency of X-ray is decreased. The loss of X-ray in the channel direction and row direction may respectively reach to 20%, depending on the distance between detector cells and the width of collimator 505, as a total the X-ray loss of 40% may be seen.

As a technology which resolves such problem as have been described above, the technology disclosed in the patent reference 1 is known. The technology disclosed in the patent reference 1 eliminates the reflectors, and arranges a plurality of photodiodes in one collimator to suppress the X-ray losses caused by the collimator and reflector and to improve the resolution.

[Patent Reference 1] JP-A-2004-93489

However, in accordance with the technology disclosed in the patent reference 1, since no reflector is placed, the crosstalk to the adjacent cells will be increased due to the light diffusion, when thickening the scintillator in order to increase the collection efficiency of the incident X-ray.

SUMMARY OF THE INVENTION

The object of the present invention therefore is to provide a detector, which may be capable of improving the collection efficiency of the X-ray while suppressing the crosstalk between detector cells, various devices and apparatuses incorporating the detector, and the method of manufacturing the detector.

The X-ray radiation detector in accordance with the present invention comprises a plurality of detection cells arranged along the detection plane of X-ray, in which each of the plurality of detection cells has a scintillator unit comprised of a scintillator, and a photoelectric transducer element provided laminatedly in the scintillator unit for transducing to electric signals the light from the scintillator unit, the scintillator units in the plurality of detector cells are mutually partitioned by a border having a groove extending along the detection plane, and the groove is formed to the depth for leaving the scintillator at the border.

Preferably, there is provided no collimator for limiting the incidence of the X-ray into the scintillator on the border.

Preferably, the scintillator provided on the border transduces to light the X-rays incident to the border in the direction of the laminar direction.

Preferably, the scintillator provided on the border is defined across the direction along the detection plane, the scintillator units are connected through the scintillator on the border, and the scintillators are provided on the approximately all surface of the detection plane.

Preferably, a reflecting member is inserted into the groove.

Preferably, the groove is hollow.

Preferably, the groove is open to the side of the photoelectric transducer element between the scintillator units, and defined to be shallower than the thickness of the scintillator units, and the scintillator on the border is provided to the side of the detection plane with respect to the groove.

Preferably, the groove is open to the side of the detector plane between the scintillator units and defined to be shallower than the thickness of the scintillator units, and the scintillator on the border is provided to the side of the photoelectric transducer element with respect to the groove.

Preferably, the thickness of the scintillator units is defined so as to transduce to lights the predetermined rate of X-ray from within the X-ray incident to the scintillator unit, and the depth of the groove is determined such that the thickness of the scintillator left on the border is equal to or less than the half of thickness of the scintillator units, while at the same time the X-ray of the rate more than a half of the predetermined rate from within the X-ray incident to the scintillator left on the border may be transduced to lights.

An X-ray imaging apparatus in accordance with the present invention comprises an X-ray radiation source, a detector for detecting an X-ray from the X-ray radiation source to output electric signals, a data acquisition means for collecting data based on the electric signals output from the detector, wherein the detector has a plurality of detection cells arranged along the X-ray radiation detection plane, each of the plurality of detection cells has a scintillator unit comprised of a scintillator, and a photoelectric transducer element provided laminatedly in the scintillator unit for transducing to electric signals the light from the scintillator unit, the scintillator units in the plurality of detector cells are mutually partitioned by a border having a groove extending along the detection plane, and the groove is formed to the depth for leaving the scintillator at the border.

An X-ray CT apparatus in accordance with the present invention comprises an X-ray radiation source for radiating X-ray to a subject, a detector located in the opposition to the X-ray radiation source around the subject, for detecting the X-ray radiation from the X-ray radiation source to output electric signals, a transporter means for revolving the X-ray radiation source and the detector around the subject, a data acquisition means for collecting data based on the electric signals output from the detector in correspondence to each of a plurality of positions with respect to the subject, an image reconstruction means for reconstructing an image based on the data collected by the data acquisition means, wherein the detector has a plurality of detection cells arranged along with the detection plane of X-ray radiation, each of the plurality of detection cells has respectively a scintillator unit comprised of a scintillator, and a photoelectric transducer element, provided laminatedly in the scintillator unit, for transducing to electric signals the light from the scintillator unit, the scintillator units in the plurality of detector cells are mutually partitioned by a border having a groove extending along the detection plane, and the groove is formed to the depth for leaving the scintillator at the border.

A method of manufacturing an X-ray radiation detector in accordance with the present invention, for manufacturing an X-ray radiation detector having a plurality of detection cells arranged along a detection plane of X-ray radiation, in which each of the plurality of detection cells respectively a scintillator unit comprised of a scintillator, and a photoelectric transducer element provided laminatedly in the scintillator unit for transducing to electric signals the light from the scintillator unit, the method comprises the steps of: providing to a scintillator member comprised of scintillators a groove shallower than the thickness of the scintillator member to partition to the plurality of scintillator units, and securing the scintillator member with the plurality of photoelectric transducer elements.

Preferably, the method further comprises the step of filling the groove with a liquid material to be cured to make a reflector.

In accordance with the present invention, the collecting efficiency of X-ray radiation can be improved while suppressing the crosstalk between cells.

Further objects and advantages of the present invention will be apparent from the following description of the preferred embodiments of the invention as illustrated in the accompanying drawings.

BRIEF DESCRIPTION OF THE DRAWINGS

FIG. 6 shows a schematic enlarged cross sectional view of a detector in accordance with second preferred embodiment of the present invention.

FIG. 7 shows a schematic enlarged cross sectional view of a detector in accordance with third preferred embodiment of the present invention.

FIG. 8 shows a schematic cross sectional view of the detector of the prior art.

DETAILED DESCRIPTION OF THE INVENTION

First Embodiment

Figure 1:
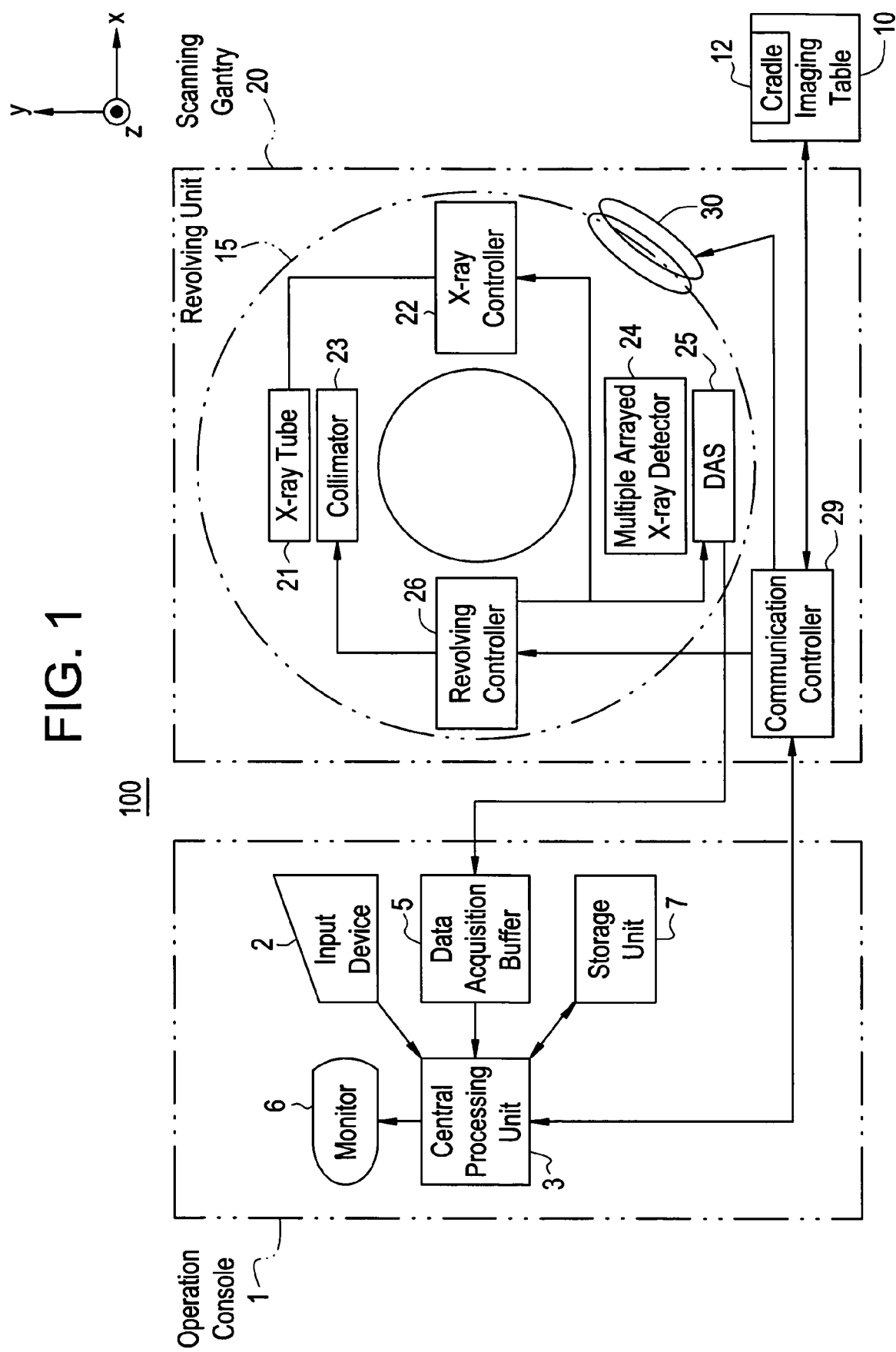
FIG. 1 shows a schematic block diagram of an X-ray CT apparatus in accordance with first embodiment of the present invention.

Now referring to FIG. 1, which shows a schematic block diagram of an X-ray CT apparatus 100 in accordance with first embodiment applied with the present invention. The X-ray CT apparatus 100 is comprised of a multi-detector (MD) type CT apparatus, which has an operation console 1, an imaging table 10, and a scanning gantry 20.

The operation console 1 includes an input device 2 for accepting the input from an operator, a data acquisition buffer 5 for collecting the projection data obtained from the scanning gantry 20, a central processing unit 3 for performing such processes as an image reconstruction based on the projection data collected in the data acquisition buffer 5, a monitor 6 for displaying a reconstructed CT image by the central processing unit 3, and a storage unit 7 for storing a program, data, and X-ray CT image.

The imaging table 10 includes a cradle 12 for carrying the subject into and out of the bore (center cavity) of the scanning gantry 20. The cradle 12 is driven horizontally and vertically by a respective motor built into the imaging table 10.

The scanning gantry 20 includes an X-ray tube 21, an X-ray controller 22, a collimator 23, a multiple arrayed X-ray detector 24, and a data acquisition system (DAS) 25, a revolving controller 26 for controlling the revolving unit 15 including the X-ray tube 21 and multiple arrayed X-ray detector 24 around the body axis of the subject, a communication controller 29 for controlling input and output of signals including control signals into and from the operation console 1 and the imaging table 10, a slip-ring 30 for supplying power to various devices in the revolving unit 15.

The X-ray tube 21 is served to operate as the X-ray radiation source, the DAS 25 and the data acquisition buffer 5 are served to operate as the data acquisition means, the revolving unit 15 is served to operate as the transporter means, and the central processing unit 3 is served to operate as the image reconstruction means.

Figure 2:
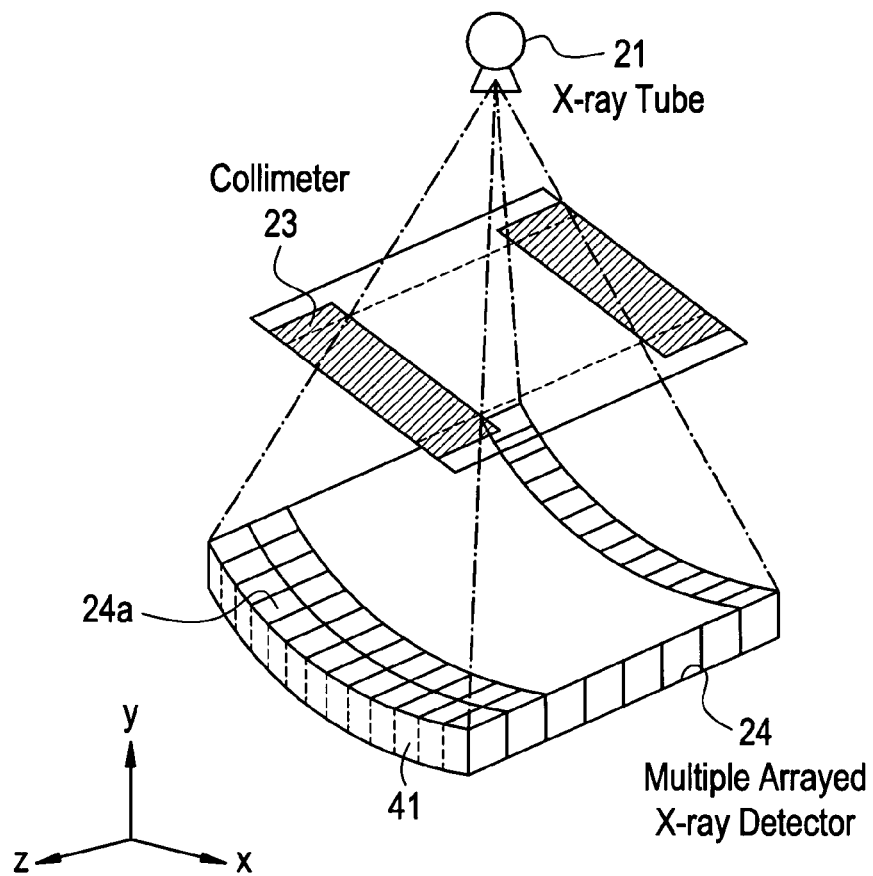
FIG. 2 shows a perspective view illustrating the overview of primary section involving the imaging by the X-ray CT apparatus shown in FIG. 1.

Now referring to FIG. 2, which shows a perspective view illustrating the overview of primary section involving the imaging by the X-ray CT apparatus 100. The X-ray tube 21 is served to radiate the X-ray of a predetermined intensity to the imaging area of the subject based on the control signals from the X-ray controller 22. The collimator 23 is located between the X-ray tube 21 and the multiple arrayed X-ray detector 24, for reshaping the X-ray radiated from the X-ray tube 21 based on the control signals from the revolving controller 26. The X-ray shaped by the collimator 23 will transmit through the subject and reach the multiple arrayed X-ray detector 24.

The multiple arrayed X-ray detector 24 has a plurality of detector cells 41 arranged both in the channel direction (x-axis direction) and row direction (z-axis direction). There may be disposed for example 1000 detector cells 41 in the channel direction, and 64 detector cells 41 in the row direction. The multiple arrayed X-ray detector 24 is formed so as to curve the detection plane 24a for receiving X-ray in an arcuate form in the channel direction.

Figure 3:
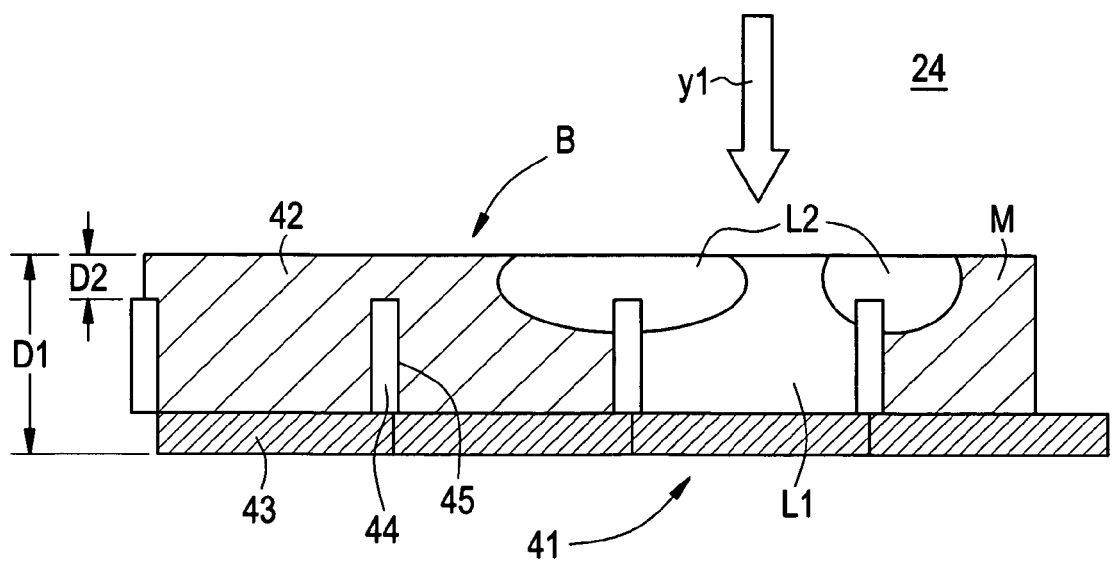
FIG. 3 shows an enlarged cross sectional view of the detector of the X-ray CT apparatus shown in FIG. 1.

Now referring to FIG. 3, which shows an enlarged cross sectional view in either the channel or row direction of the multiple arrayed X-ray detector 24. The detector cell 41 includes a scintillator unit 42 composed of a scintillator, and a photodiode 43 served as the photoelectric transducer element. The scintillator unit 42 is formed by partitioning the scintillator member M of a uniform thickness D1 with the groove 45 provided extending in both channel and row directions. In other words, each scintillator unit 42 is partitioned from another by the border B having a groove 45. Any of well known materials appropriate for the scintillator may be used.

The groove 45 is provided so as to open in the photodiode 43 side while formed shallower than the thickness D1 of the scintillator unit 42 so that the X-ray incident side of the border B holds a scintillator of the thickness D2. This indicates that the scintillator units communicate to each other through the scintillator on the border, so that the entire face of the detection plane 24a (see FIG. 2) is covered by the scintillators. There is a reflector 44 for preventing the light leakage between the scintillator units 42 in the groove 45. The multiple arrayed X-ray detector 24 incorporates no collimator (the collimator 505 shown in FIG. 8) for reshaping the X-ray incident to the scintillator prior to entering to the scintillator.

In the multiple arrayed X-ray detector 24 as have been described above, the X-ray incident to one scintillator unit 42, shown by the arrow y1, is transduced to light L1 by the scintillator unit 42. Thus transduced light L1 is received by the photodiode 41 corresponding to the scintillator unit 42, and the electric signal in relation to the amount of received light is then output to the DAS 25 (see FIG. 1). The reflector 44 at this moment prevents the crosstalk to the adjoining detector cells 41.

In addition in the border B, which has not been used for X-ray acquisition due to the existence of the collimator and the reflector in the Prior Art, X-ray will be transduced to light L2 by the scintillator held in the incident X-ray side of the reflector 44. Thus transduced light L2 will be received by the photodiode 41 as part of light L1. This allows improving the efficiency of X-ray acquisition.

Figure 4:
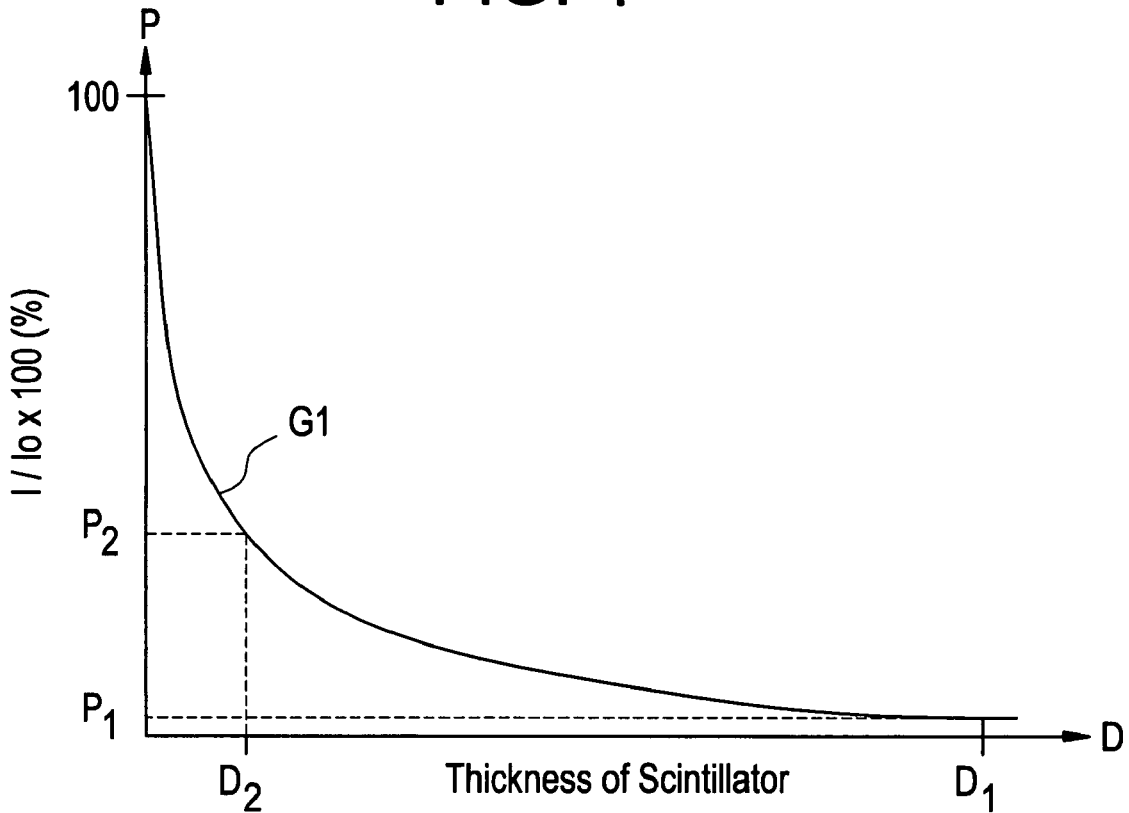
FIG. 4 shows an example of procedure for setting the thickness of the scintillator unit of the detector shown in FIG. 3.

Now referring to FIG. 4, which shows an example of procedure for setting the thickness D1 of the scintillator unit 42 and the thickness D2 of the border B. The abscissa axis D indicates the thickness of scintillator through which X-ray passes, and the ordinate axis P indicates the percentage distribution of the X-ray intensity Io incident to the scintillator and the X-ray intensity I having passed the scintillator. The X-ray intensity I after passed the scintillator can be calculated as follows:

$$I = I_o \exp(-\mu D)$$

where $\mu$ is an attenuation index defined by the material used for the scintillator.

As shown by a curve G1 in FIG. 4, X-ray attenuates in proportion to the thickness of the scintillator. The thickness D1 of the scintillator unit therefore is set such that the X-ray is transduced to light until decreasing to a predetermined value P1. For example, P1 may be 2%. In other words, it is defined so as to transduce approximately 98% of X-ray to light. In a similar manner, the thickness D2 is set such that the X-ray incident to the border B is transduced to light until decreasing to a predetermined value P2. For example, P2 may be 30%. In other words, D2 is set to transduce approximately 70% of X-ray incident to the border B into light.

As shown in FIG. 4, since the attenuation of X-ray can be indicated as an exponential function, and the relatively most part of X-ray is transduced to light near the surface of the scintillator, the efficiency of X-ray acquisition can be efficiently improved, with the reflector 44 placed at a sufficient thickness for suppressing the crosstalk and with scintillator having thickness relatively thin with respect to the thickness D1 of the scintillator unit 42. For example, the thickness D1 of the scintillator unit 42 may be defined so as to transduce into light a predetermined rate of X-ray (100−P1(%)) from within the X-ray incident to the scintillator unit 42, the depth of the groove 45 may be defined such that the thickness D2 of the scintillator left in the border B is less than a half of the thickness D1 (D2<D1/2), and also defined such that the X-ray of more than a half of a predetermined rate from within the X-ray incident into the scintillator left on the border B is transduced into light (100−P2>(100−P1)/2).

Figure 5:
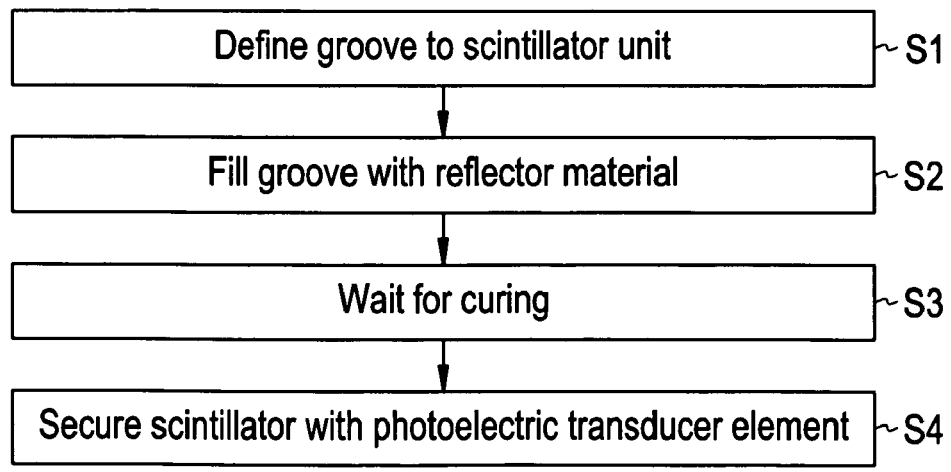
FIG. 5 shows a flow chart indicative of the overview of method of manufacturing the scintillator of the detector shown in FIG. 3.

Although the multiple arrayed X-ray detector 24 as have been described above can be produced in any of appropriate manufacturing methods, an exemplary method will be described in greater details herein below. Referring to FIG. 5, there is shown a flow chart indicative of the overview of method of manufacturing the multiple arrayed X-ray detector 24.

First, the groove 45 is formed on the scintillator member M of a uniform thickness to partition the scintillator member M into a plurality of scintillator units 42 (step S1). The formation of the groove 45 may be performed by any of suitable methods that can process the scintillator unit 42 at the required precision. For example the groove 45 can be formed by using a grinder in the form of blade.

Second, the reflector agent is filled into the groove 45 (step S2). The reflector agent may be selected from any of appropriate materials, provided that the agent may be cured after filling into the groove and may be able to insulate or reflect lights after being cured to suppress the light leakage between the scintillator units 42, for example a glue can be used.

Then wait for the cure of the reflector agent (step S3), and after cured, the scintillator member M and the photodiode 43 are secured (step S4). The fixing of the scintillator member M with the photodiode 43 may be done in an appropriate manner. For example it can be adhered with an adhesive.

Second Embodiment

Now referring to FIG. 6, which shows a schematic enlarged cross sectional view of a detector 60 in accordance with second preferred embodiment applied with the present invention. It should be noted here that the detector 60 may be configured to be a multiple arrayed detector for the X-ray CT apparatus 100, in a manner similar to the first embodiment above. The detector 60, as similar to the multiple arrayed X-ray detector 24, has a plurality of detector cells 61, in which each of detector cells 61 has respectively a scintillator unit 62 and a photodiode 63. However it differs from the first preferred embodiment in that a groove 65 in the border B is provided in the side of incident X-ray of the scintillator unit 62, and in that the groove 65 has no reflector formed but is hollow.

In the detector 60 the groove 65 is served to suppress the crosstalk between the detector cells 61. That is, since the refractive index of light in the scintillator is different from that in the air, the light transduced from the X-ray by the scintillator unit 62 will be reflected by the groove 65, in order to prevent the leakage to the adjoining detector cells 61.

On the other hand, the X-ray which enters the groove 65 in the direction of arrow y1 will be transduced into light L3 by the scintillator located in the side of photodiode 63 in the border B to be received by the photodiode 63. This allows improving the acquisition efficiency of the X-ray.

In the detector 60, the thickness D2 of the scintillator in the border B can be determined as similar to that described in the foregoing first embodiment.

The method of manufacturing the detector 60 may be so as to omit the steps S2 and S3 in the method of manufacturing as shown in FIG. 5, and then, in step S4, it may be sufficient to secure the photodiode 63 in the opposing side of the plane that mount the groove 65 of the scintillator member M.

Third Embodiment

Now referring to FIG. 7, which shows a schematic cross sectional view of a detector 70 in accordance with the preferred embodiment applied with the present invention. It should be noted here that the detector 70 may be formed as a multiple arrayed X-ray radiation detector used for the X-ray CT apparatus 100 in a manner similar to that of first embodiment. The detector 70, as similar to the multiple arrayed X-ray detector 24, has a plurality of detector cells 71, and each of detector cells 71 has respectively a scintillator unit 72 and a photodiode 73. However it differs from that described in first embodiment in that the grooves 75*a* and 75*b* in the border B are defined in the side of incident X-ray of the scintillator unit 72 and in the side of photodiode 73, respectively, and that a scintillator is left in the middle of the border B. In the grooves 75*a* and 75*b*, X-ray permeable reflectors 74*a* and 74*b* are inserted, respectively.

In the detector 70, the reflectors 75*a* and 75*b* are served to suppress the crosstalk between detector cells 71. On the other hand, the X-ray y1 incident to the reflector 75*a* will be transduced to light L4 by the scintillator between the reflectors 75*a* and 75*b* to be received by the photodiode 73 as part of light L1. This allows improving the efficiency of X-ray acquisition.

In the detector 70, the thickness D2 of the scintillator in the border B may be defined in a manner similar to that described above in first embodiment.

The manufacturing method of the detector 70 may be such that steps S2 and S3 in the manufacturing method shown in FIG. 5 are carried out to the both side of the scintillator member M.

In accordance with the embodiments as have been described above, the groove solid or hollow provided in the border that partition the scintillator units will suppress the crosstalk, while on the other hand the scintillator provided on the border will transduce into light the X-ray incident to the border to allow improving the acquisition efficiency of X-ray.

Furthermore, since partitioning the scintillator units by completely cropping the scintillator member is not required, it is contemplated that the manufacturing method can be simplified and the precision of X-ray detection can be improved. This indicates that the manufacturing method of detectors in the prior art is comprised of completely crop the scintillator member to separate each unit to form the scintillator unit for each detector cell, then each scintillator unit are adhered and secured each other to form a detector. However, in the disclosed preferred embodiment, the method of manufacturing is contemplated to be simplified by neither cropping nor separating as shown in FIG. 5 to omit the process of adhering each scintillator to another to secure them each other, because there is no need to crop or separate the scintillator units. This allows not deteriorating the precision of relative positioning between scintillator units in adhering and securing the scintillator units, resulting in that the X-ray can be detected at a sufficient positional precision even if the collimator for reshaping the X-ray in front of the scintillator is omitted.

The present invention is intended not to be limited to the embodiments described above, but it can be embodied in a variety of modes.

In the border, the scintillator placed in part thereof in the direction of lamination (in the direction of incident X-ray) of photodiode and scintillator may be defined over the entire area of the border extending in the channel and row directions (in the direction along the detection plane) as is in the preferred embodiment, or it may be defined except for some part in the direction along the detection plane. In any cases, the efficiency of X-ray acquisition will be increased when compared with a detector of the prior art having no scintillator in the border area, while the crosstalk will be suppressed when compared to a detector having no reflector.

The position of scintillators in the border and the solid or hollow configurations of grooves can be appropriately combined. For example, in the first embodiment above, the groove 45 may be hollow, in the second embodiment above, an X-ray transmissible reflector may be inserted into the groove 65, or in the third embodiment above, at least any one of grooves 75*a* and 75*b* may be made hollow.

The detector in accordance with the present invention provides scintillators in the border of scintillator units, the manufacturing method thereof is not a matter of concern provided that the X-ray incident to the lamination direction of the scintillator and photodiode with respect to the border can be transduced to light. For example, the scintillator may be arranged to the border of the scintillator unit once separated. However, as have been described above, a simple manufacturing method is to leave scintillator by defining on the scintillator member a groove that is shallower than the thickness of the scintillator member.

The reflector member to be inserted into the groove may be made of any material, provided that it can suppress the light leakage by inserting between scintillator units. Although in the embodiments above there has been presented an example of material which is in the form of liquid and may be injected into the groove and cured therein later, a solid material can be inserted. In addition, a shield material for shielding the light material can be inserted instead of reflector.

Many widely different embodiments of the invention may be configured without departing from the spirit and the scope of the present invention. It should be understood that the present invention is not limited to the specific embodiments described in the specification, except as defined in the appended claims.

The invention claimed is:

1. An X-ray radiation detector comprising:
    a plurality of detection cells arranged along a detection plane of the X-ray;
    each of said plurality of detector cells having respectively a scintillator unit comprised of a scintillator, and a photoelectric transducer element provided laminatedly in said scintillator unit for transducing the light from said scintillator unit to electric signals;
    said scintillator units in said plurality of detector cells being mutually partitioned by a border having a groove extending along said detection plane; and
    said groove being formed to a depth for leaving the scintillator at said border, wherein the depth of said groove is determined such that a thickness of the scintillator left on said border is equal to or less than half of a thickness of said scintillator unit, and wherein the depth of said groove is determined such that an X-ray of a rate of more than a half of a predetermined rate from within the X-ray incident to the scintillator left on said border transduces to light.

2. An X-ray radiation detector according to claim 1, wherein no collimator for limiting the incidence of said X-ray into said scintillator on said border is provided.

3. An X-ray radiation detector according to claim 1, wherein the scintillator provided on said border transduces to light the X-rays incident to said border in the direction of said laminar direction.

4. An X-ray radiation detector according to claim 1, wherein the scintillator provided on said border is defined across the direction along with said detection plane, said scintillator units are connected through the scintillator on said border, and the scintillators are provided on approximately all of a surface of said detection plane.

5. An X-ray radiation detector according to claim 1, wherein a reflecting member is inserted into said groove.

6. An X-ray radiation detector according to claim 1, wherein the groove is hollow.

7. An X-ray radiation detector according to claim 1, wherein said groove is open to a side of said photoelectric transducer element adjacent to said scintillator units, and defined to be shallower than a thickness of each of said scintillator units, and said scintillator on said border is provided to the side of said detection plane with respect to said groove.

8. An X-ray radiation detector according to claim 1, wherein said groove is open to a side of said detector plane adjacent to said scintillator units and defined to be shallower than the thickness of each of said scintillator units, and said scintillator on said border is provided to the side of said photoelectric transducer element with respect to said groove.

9. An X-ray radiation detector according to claim 1, wherein the thickness of said scintillator unit is defined so as to transduce to light the predetermined rate of X-ray from within the X-ray incident to said scintillator unit.

10. An X-ray imaging apparatus comprising:
    an X-ray radiation source;
    a detector for detecting X-ray from said X-ray radiation source to output electric signals; and
    a data acquisition device for collecting data based on the electric signals output from said detector,
    wherein:
    said detector has a plurality of detection cells arranged along the X-ray radiation detection plane;
    each of said plurality of detection cells has a scintillator unit comprised of a scintillator, and a photoelectric transducer element provided laminatedly in said scintillator unit for transducing to electric signals the light from said scintillator unit;
    said scintillator units in said plurality of detector cells are mutually partitioned by a border having a groove extending along said detection plane; and
    said groove is formed to a depth for leaving the scintillator at said border, wherein the depth of said groove is determined such that a thickness of the scintillator left on said border is equal to or less than half of the thickness of said scintillator unit, and wherein the depth of said groove is determined such that an X-ray of a rate of more than a half of the predetermined rate from within the X-ray incident to the scintillator left on said border transduces to light.

11. An X-ray imaging apparatus according to claim 10, wherein the scintillator provided on said border is defined across the direction along with said detection plane, said scintillator units are connected through the scintillator on said border, and the scintillators are provided on approximately all of a surface of said detection plane.

12. An X-ray imaging apparatus according to claim 10, wherein the scintillator provided on said border transduces to light the X-rays incident to said border in a laminar direction.

13. An X-ray imaging apparatus according to claim 10, wherein said groove is open to a side of at least one of said photoelectric transducer element adjacent to said scintillator units, and said groove is open to a side of said detector plane adjacent to said scintillator units.

14. An X-ray imaging apparatus according to claim 10, wherein the thickness of said scintillator unit is defined so as to transduce to light the predetermined rate of X-ray from within the X-ray incident to said scintillator unit.

15. An X-ray CT apparatus comprising:
    an X-ray radiation source for radiating X-ray to a subject;
    a detector located in the opposition to said X-ray radiation source around said subject, for detecting the X-ray radiation from said X-ray radiation source to output electric signals;
    a transporter device for revolving said X-ray radiation source and said detector around said subject;
    a data acquisition device for collecting data based on the electric signals output from said detector in correspondence to each of a plurality of positions with respect to said subject;
    an image reconstruction device for reconstructing an image based on the data collected by said data acquisition device;
    wherein:
    said detector has a plurality of detection cells arranged along with the detection plane of X-ray radiation;
    each of said plurality of detection cells has respectively a scintillator unit comprised of a scintillator, and a photoelectric transducer element, provided laminatedly in said scintillator unit, for transducing to electric signals the light from said scintillator unit;
    said scintillator units in said plurality of detector cells are mutually partitioned by a border having a groove extending along said detection plane; and
    said groove is formed to the depth for leaving the scintillator at said border, wherein the depth of said groove is determined such that a thickness of the scintillator left on said border is equal to or less than half of the thickness of said scintillator unit, and wherein the depth of said groove is determined such that an X-ray of a rate of more than a half of the predetermined rate from within the X-ray incident to the scintillator left on said border transduces to light.

16. An X-ray CT apparatus according to claim 15, wherein the scintillator provided on said border is defined across the direction along with said detection plane, said scintillator units are connected through the scintillator on said border, and the scintillators are provided on approximately all of a surface of said detection plane.

17. An X-ray CT apparatus according to claim 15, wherein the scintillator provided on said border transduces to light the X-rays incident to said border in a laminar direction.

18. An X-ray CT apparatus according to claim 15, wherein said groove is open to a side of said photoelectric transducer element adjacent to said scintillator units, and said groove is open to a side of said detector plane adjacent to said scintillator units.

19. An X-ray CT apparatus according to claim 15, wherein the thickness of said scintillator unit is defined so as to transduce to light a predetermined rate of X-ray from within the X-ray incident to said scintillator unit.

20. A method of manufacturing an X-ray radiation detector, for manufacturing an X-ray radiation detector having a plurality of detection cells arranged along a detection plane of X-ray radiation, in which each of said plurality of detection cells respectively a scintillator unit comprised of a scintillator, and a photoelectric transducer element provided laminatedly in said scintillator unit for transducing to electric signals the light from said scintillator unit, said method comprising the steps of:
providing to said scintillator member a groove including a depth shallower than the thickness of said scintillator member to partition said scintillator member into a plurality of scintillator units, wherein the depth of said groove is determined such that a thickness of scintillator left on a border is equal to or less than half of the thickness of said scintillator member, and wherein the depth of said groove is determined such that an X-ray of a rate of more than a half of the predetermined rate from within the X-ray incident to the scintillator left on said border transduces to light; and
securing said scintillator member with said plurality of photoelectric transducer elements.

21. A method of manufacturing an X-ray radiation detector according to claim 20, further comprising the step of:
filling said grooves with a liquid material to be cured to make a reflector.

22. A method according to claim 20 further comprising providing a scintillator member comprising a thickness defined so as to transduce to light a predetermined rate of X-ray from within the X-ray incident to said scintillator unit.

* * * * *